Patented Aug. 19, 1941

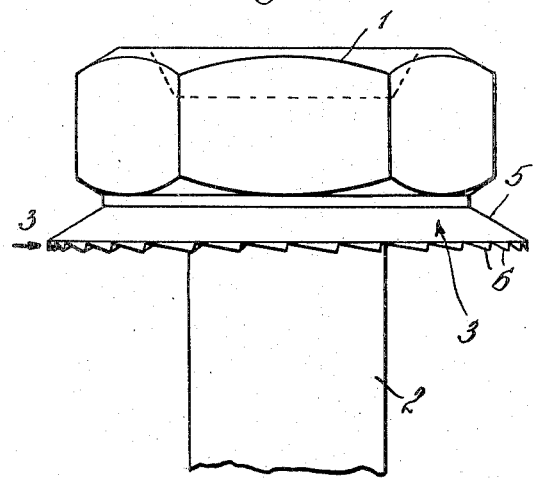
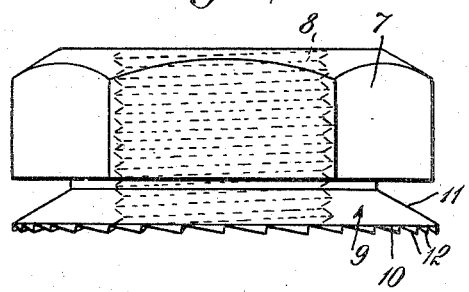
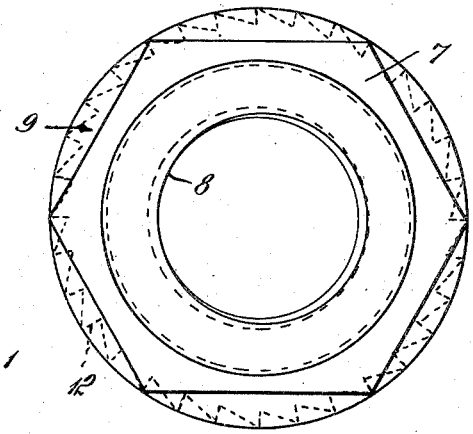
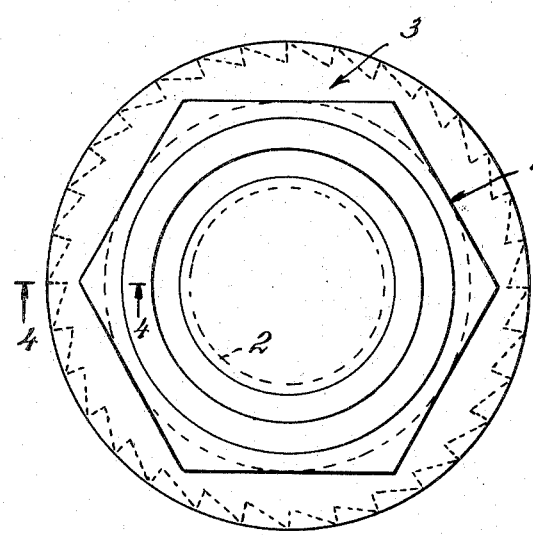
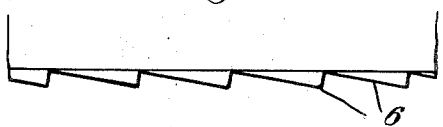
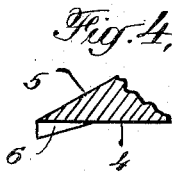

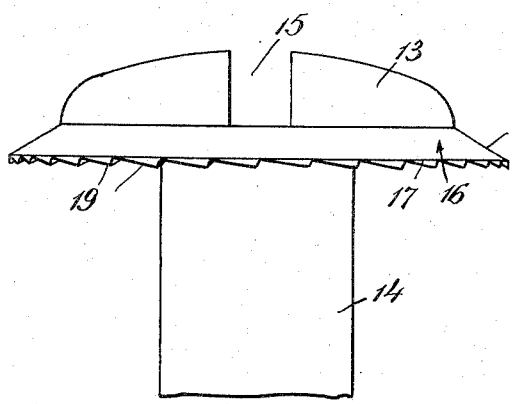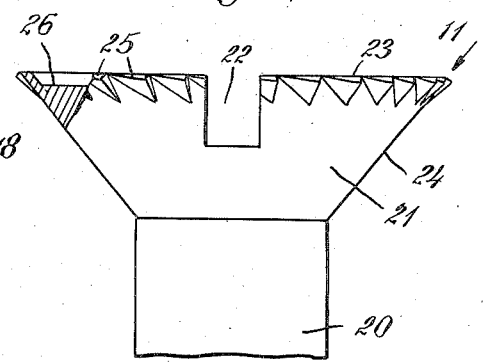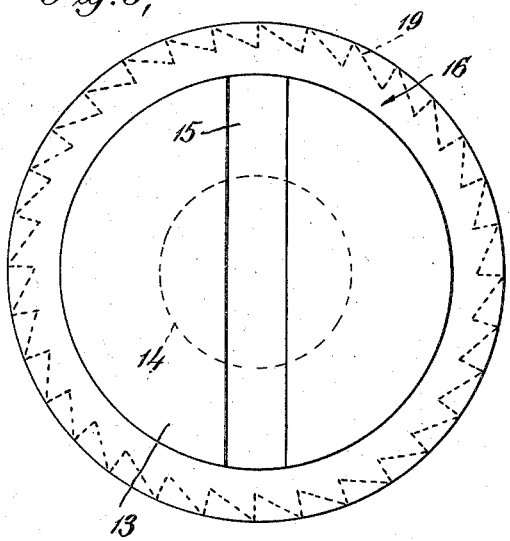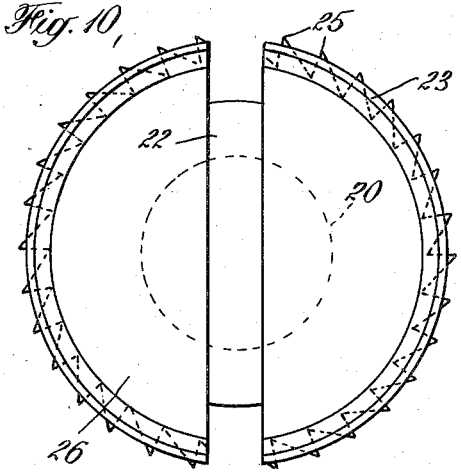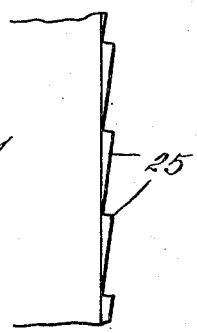

2,253,241

UNITED STATES PATENT OFFICE 2,253,241

NUT OR BOLT LOCK

Robert A. MacDonald, Greenwich, Conn., assignor to Russell, Burdsall & Ward Bolt & Nut Company, Port Chester, N. Y., a corporation of New York Application January 16, 1940, Serial No. 314,096

3 Claims. (Cl. 151—37)

This invention relates to nut locks and more particularly to a locking means that may be applied to the head of a bolt or screw or to a nut and which will ordinarily prevent removal of the nut bolt or screw by normal vibration.

In the present invention I provide a bolt head, a screw head or a nut having a flange or portion which is relatively thin and which is so positioned that it will be placed under tension when the head of the bolt or screw or the face of the nut engages the surface of the object to which the fastening means is applied. I further provide the face of the flange with locking teeth which project slightly from the surface and are caused to bite into the adjacent surface by the spring action of the flange to prevent the nut, bolt or screw from turning in the opposite direction.

By forming a flange directly on the bolt or screw head or in the face of the nut and providing it with locking teeth I produce a simple locking means for a screw threaded element which is formed integral therewith and in which no additional parts need to be assembled when the screw threaded means is to be applied. This results in a material labor saving as compared to the use of locking means in the form of separate washers which must be assembled with the bolt or screw before being applied. It also produces an improved locking means which may be manufactured at a very slight increase in cost over the cost of an ordinary nut, bolt or screw not provided with such locking means.

In the accompanying drawings I have shown several forms of the invention. In this showing:

Fig. 1 is a side elevation of a bolt head and portion of a bolt;

Fig. 2 is a plan view thereof;

Fig. 3 is an enlarged development in the direction of the arrow 3 of Fig. 1;

Fig. 4 is a detailed, sectional view on line 4—4 of Fig. 2;

Fig. 5 is a side elevation of a nut showing the invention applied;

Fig. 6 is a plan view thereof;

Fig. 7 is a side elevation of a portion of a round head screw;

Fig. 8 is a plan view thereof;

Fig. 9 is a side elevation of a portion of a flat head screw;

Fig. 10 is a plan view thereof; and

Fig. 11 is an enlarged development in the direction of the arrow 11 of Fig. 9.

Referring to Figs. 1 to 4 of the drawings, the reference numeral 1 designates a bolt head which may be hexagonal as shown or of any other desired shape. The bolt is provided with the usual cylindrical portion 2 which is threaded at the end remote from the head (not shown) and the face of the bolt head adjacent the stem which contacts with the work is provided with a flange designated generally by the reference numeral 3. As shown this flange is of greater diameter than the bolt head and is provided with a lower engaging face 4 parallel to the top of the bolt head or at right angles to the axis of the bolt (see Fig. 4). The flange is provided with a relatively thin peripheral edge which may be formed by providing the upper surface 5 at an angle to the lower surface 4. Locking teeth 6 are formed on the lower face 4 of the flange as shown.

When the bolt is in use and is tightened, the face 4 engages the surface of the object to which the bolt is applied and as the bolt is tightened further the outer edge of the flange is placed under tension. At the same time the teeth 6 grip into the surface of the object to which the bolt is applied and thus prevent turning of the bolt in a reverse direction except by the application of sufficient force to overcome the locking effect of the teeth. The bolt may be suitably hardened by carburizing, heat treatment or the like to insure proper gripping by the teeth 6. The force necessary to move the bolt is greater than the force that would ordinarily be created by normal vibration or any other accidental force that may be applied to the bolt head.

In Figs. 5 and 6 of the drawings I have shown a nut 7 which may be hexagonal or of any other desired shape and which is provided with the usual tapped bore 8. A flange 9, similar to the flange 3 of the bolt shown in Fig. 1, is arranged on one face of the nut and as here shown the flange may be of the same diameter as the diameter of the nut. I may apply either form to a nut or bolt, that is the flange 9 of a nut may be of greater diameter similar to the flange 3 shown in Fig. 1 or the flange 3 of a bolt head may be of the same diameter as the bolt head similar to the flange 9 shown in Fig. 5. The flange 9 is provided with a flat surface 10 and the stock may be under-cut or shaped to form an upper surface 11 at an angle thereto to produce a relatively thin peripheral edge. The face 10 is provided with teeth 12 similar to those heretofore described in connection with the bolt head shown in Figs. 1 to 4. The operation of the locking means of the nut shown in Figs. 5 and 6 is substantially as that heretofore described in connection with the bolt head of Figs. 1 to 4.

In Figs. 7 and 8 of the drawings I have shown the invention applied to a round head screw in which the reference numeral 13 represents the head of the screw and 14 represents the stem. The head may be provided with a slot 15 for the reception of a screw-driver or other tool. The head of the screw is likewise provided with a flange 16 having a lower surface 17 at right angles to the axis of the screw and having a thin, peripheral portion which may be readily placed under tension when the screw is tightened. The upper surface 18 of the flange may be arranged at an angle to the lower surface 17 for this purpose. Adjacent the edge of the flange the lower surface 16 is provided with teeth 19 similar to those heretofore described in connection with Figs. 1 to 6.

In Figs. 9 to 11 of the drawings I have shown a flat head screw comprising a stem 20 and a head 21. The head 21 may be provided with a slot 22 for the reception of a screw-driver or other suitable tool. The head is of the usual cone-shaped form of flat head screw head and has a flat upper surface 23 and a curved surface 24 forming the wall of the cone. In applying the invention to a bolt head, nut or round head screw, the locking teeth are formed upon the surface which is parallel to the surface of the object to which the fastening device is applied whereas when the invention is applied to a flat head screw, I provide locking teeth 25 on the cone surface 24. As shown in Figs. 10 and 11, these teeth project slightly beyond the surface 24. Adjacent the edges of the head of the screw, where the teeth 25 are formed, the screw head is thin, due to the angle between the surfaces 23 and 24. In some instances the top of the screw may be provided with a recess 26 to produce a peripheral portion of the desired thinness. This portion of the screw head can thus be readily placed under tension by forcing the screw home. When this is done the teeth 25 bite into the article to which the screw is applied and the tension upon the screw head forms a very efficient locking means.

In the claims the term "screw threaded element" is employed to designate a bolt head, nut or screw.

I claim:

1. A screw threaded element comprising a head having a smooth engaging surface of revolution at an angle to the axis of the screw threaded element and forming an effective bearing area, and having a second surface at an acute angle thereto forming a thin peripheral portion, and locking teeth formed at the edge of the engaging surface of the thin peripheral portion beyond the effective bearing area and projecting therefrom.

2. A screw threaded element having a flat engaging surface at right angles to its axis, the element being of greater diameter adjacent the engaging surface than the remainder of the element forming a peripheral flange, the upper surface of the flange being at an acute angle to the engaging surface producing a thin peripheral portion capable of being placed under tension, and locking teeth formed at the edge of the engaging surface of the thin peripheral portion and projecting therefrom.

3. A flat head screw comprising a stem and a head, the head having a smooth engaging surface of revolution, and having a second surface at an acute angle thereto forming a thin peripheral portion capable of being placed under tension, and locking teeth formed at the edge of the thin peripheral portion and projecting therefrom.

ROBERT A. MacDONALD.